(12) United States Patent
Paley et al.

(10) Patent No.: US 12,236,119 B2
(45) Date of Patent: Feb. 25, 2025

(54) SYSTEMS AND METHODS FOR BALANCING MULTIPLE PARTITIONS OF NON-VOLATILE MEMORY

(71) Applicant: Apple Inc., Cupertino, CA (US)

(72) Inventors: Alexander Paley, San Jose, CA (US); Andrew W. Vogan, Austin, TX (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 17/648,540

(22) Filed: Jan. 20, 2022

(65) Prior Publication Data

US 2022/0147258 A1 May 12, 2022

Related U.S. Application Data

(62) Division of application No. 16/277,230, filed on Feb. 15, 2019, now Pat. No. 11,256,436.

(51) Int. Cl.
G06F 3/06 (2006.01)

(52) U.S. Cl.
CPC .......... G06F 3/0644 (2013.01); G06F 3/0616 (2013.01); G06F 3/0659 (2013.01); G06F 3/0679 (2013.01); *G06F 2206/1012* (2013.01)

(58) Field of Classification Search
CPC .... G06F 3/0644; G06F 3/0616; G06F 3/0659; G06F 3/0679; G06F 12/00; G06F 13/00
See application file for complete search history.

(56) References Cited

U.S. PATENT DOCUMENTS

| | | | | |
|---|---|---|---|---|
| 9,672,905 B1* | 6/2017 | Gold | ................... | G06F 3/065 |
| 9,972,396 B1 | 5/2018 | Naik et al. | | |
| 2010/0169540 A1* | 7/2010 | Sinclair | ............... | G06F 12/0246 |
| | | | | 711/E12.008 |
| 2013/0159600 A1* | 6/2013 | Dror | ................... | G06F 12/02 |
| | | | | 711/E12.008 |
| 2016/0170663 A1 | 6/2016 | Masumoto et al. | | |

* cited by examiner

*Primary Examiner* — Tuan V Thai
(74) *Attorney, Agent, or Firm* — DICKINSON WRIGHT RLLP (57) ABSTRACT

Systems and methods for balancing multiple partitions of non-volatile memory devices are provided. Embodiments discussed herein execute a balance proportion scheme in connection with a NVM that is partitioned to have multiple partition types. Each partition type has an associated endurance that defines an average number of program/erase (P/E) cycles it can endure before it reaches failure. For example, a first partition type may have a substantially greater endurance than a second partition type. The balance proportion scheme ensures that, even though each partition type has a different associated endurance, all partition types are used proportionally with respect to each other to balance their respective P/E cycles. This way, both partition types will reach the upper limits of their respective endurance levels out at approximately the same time.

20 Claims, 7 Drawing Sheets

| SLC/TLC P/E Diff, % | TLC Proportion, Units | SLC Proportion, Units |
|---|---|---|
| 1-9 | 5 | 80 |
| 10-19 | 5 | 70 |
| 20-29 | 6 | 70 |
| 30-39 | 6 | 60 |
| 40-49 | 6 | 50 |
| 50-59 | 7 | 40 |
| 60-69 | 7 | 35 |
| 70-79 | 7 | 20 |
| 80-89 | 7 | 20 |
| 90-99 | 9 | 20 |
| 100 | 9 | 19 |

| SLC/TLC P/E Diff, % | TLC Proportion, Units | SLC Proportion, Units |
|---|---|---|
| Any Percentage | 0 | 100 |

FIG. 4B

| SLC/TLC P/E Diff % | TLC Proportion, Stripe | SLC Proportion, Stripe |
|---|---|---|
| 1-9 | 3 | 11/12 |
| 10-19 | 3 | 10 |
| 20-29 | 3 | 8/9 |
| 30-39 | 3 | 7/8 |
| 40-49 | 3 | 6/7 |
| 50-59 | 3 | 5/6 |
| 60-69 | 3 | 4/5 |
| 70-79 | 3 | 3/4 |
| 80-89 | 3 | 2/3 |
| 90-99 | 6 | 2 |
| 100 and more | 6 | 1/2 |

SYSTEMS AND METHODS FOR BALANCING MULTIPLE PARTITIONS OF NON-VOLATILE MEMORY

CROSS-REFERENCE TO RELATED APPLICATIONS

The present application is a division of U.S. application Ser. No. 16/277,230, filed Feb. 15, 2019, entitled "SYSTEMS AND METHODS FOR BALANCING MULTIPLE PARTITIONS OF NON-VOLATILE MEMORY," the content of which is incorporated herein by reference in its entirety for all purposes.

TECHNICAL FIELD

This patent specification generally relates to non-volatile memory devices, and more particularly, to balancing multiple partitions of non-volatile memory.

BACKGROUND

Various types of non-volatile memory ("NVM"), such as flash memory (e.g., NAND flash memory and NOR flash memory), can be used for mass storage. For example, consumer electronics (e.g., portable media players) use flash memory to store data, including music, videos, images, and other types of information. The NVM is expected to reliably retain data for a minimum amount of time during its operational life. NVM can be organized as single-level cells (SLC), multi-level cells (MLC), or a combination thereof. The endurance performance of SLC and MLC is different, with SLC typically having a much higher endurance than MLC. In conventional systems that use a dual partition NMV arrangement—both SLC and MLC—it has been found that one partition may wear out at a different rate than the other partition, resulting in unbalanced usage of the NVM.

SUMMARY

Systems and methods for balancing multiple partitions of non-volatile memory devices are provided. Embodiments discussed herein execute a balance proportion scheme in connection with a NVM that is partitioned to have multiple partition types. Each partition type has an associated endurance that defines an average number of program/erase (P/E) cycles it can endure before it reaches failure. For example, a first partition type may have a substantially greater endurance than a second partition type. The balance proportion scheme ensures that, even though each partition type has a different associated endurance, all partition types are used proportionally with respect to each other to balance their respective P/E cycles. This way, both partition types will reach the upper limits of their respective endurance levels at approximately the same time.

In one embodiment, a system is provided that can include non-volatile memory comprising first partition and second partition each having a different program/erase endurance and control circuitry. The control circuitry can be configured to access parameters associated with each of the first partition and the second partition, wherein the parameters comprise program/erase cycles for each of the first partition and the second partition, determine a difference between program/erase cycles of the first partition and program/erase cycles of the second partition, adjust a balance proportion scheme based on the difference, and execute write operations by directing data to the first partition and the second partition in accordance with the adjusted balance proportion scheme.

In another embodiment, a methods implemented in a system including non-volatile memory comprising a first partition and a second partition each having different program/erase endurances is provided. The method can include accessing parameters associated with each of the first partition and the second partition, and evaluating the parameters to determine whether the first partition or the second partition is overheating, wherein overheating indicates that one of the first partition and second partition has a higher proportional usage than the other partition. In response to determining that the first partition is overheating, the method can implement a first balancing scheme that balances a proportional usage of the first partition relative to the second partition to prevent the first partition from prematurely reaching an end of life parameter. In response to determining that the second partition is overheating, the method can implement a second balancing scheme that balances a proportional usage of the second partition relative to the first partition to prevent the second partition from prematurely reaching the end of life parameter. The can execute write operations by directing data to the first and second partitions in accordance with the first balancing scheme or the second balancing scheme.

In another embodiment, a memory system can include non-volatile memory comprising a first partition and a second partition each having a different program/erase endurance, and control circuitry configured to direct write data to the first partition and the second partition according to a balance proportion scheme, wherein the balance proportion scheme balances data writes to the first and second partitions such that scaled program/erase cycles of the first partition is at or near parity with program/erase cycles of the second partition.

A further understanding of the nature and advantages of the embodiments discussed herein may be realized by reference to the remaining portions of the specification and the drawings.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

Figure 1:
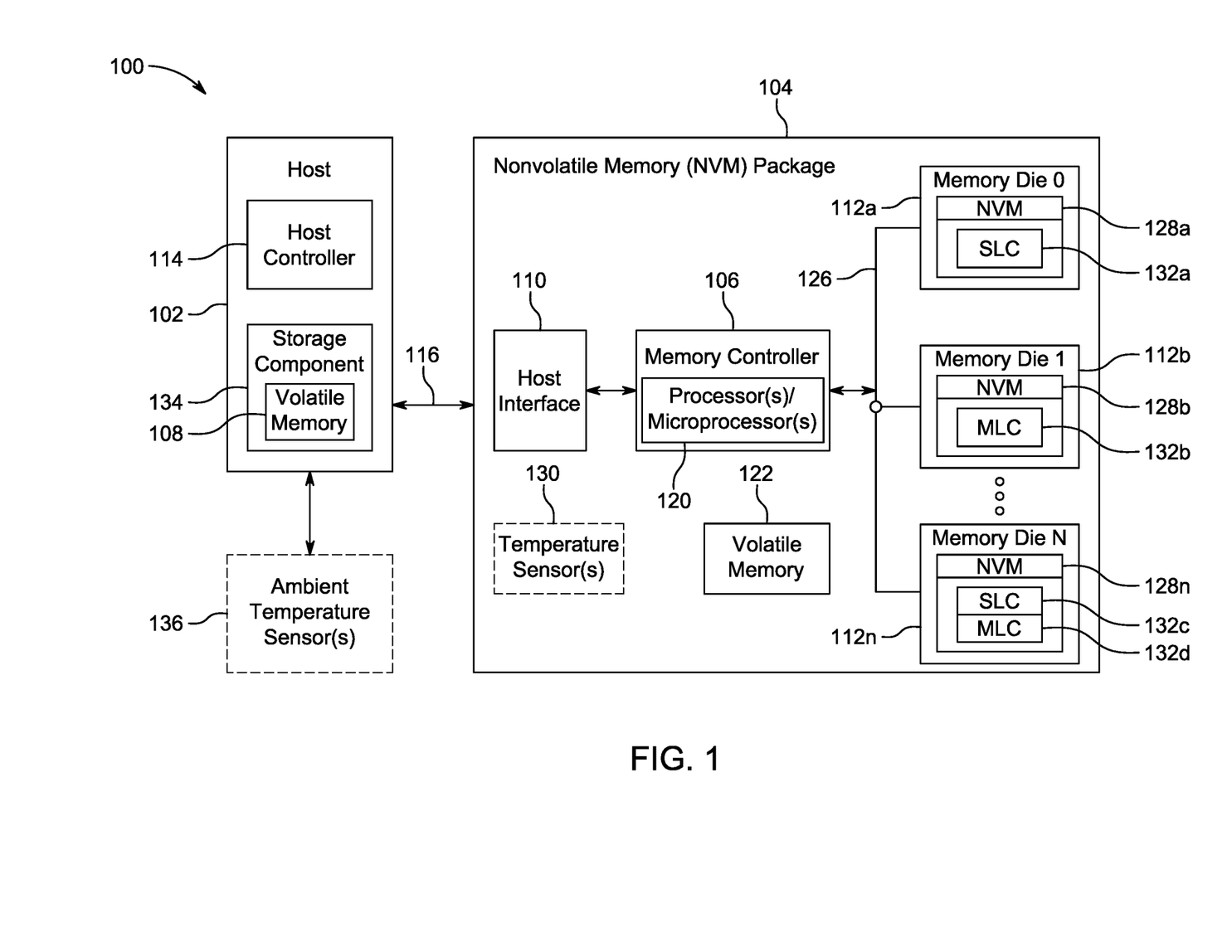
FIG. 1 is a diagram depicting an illustrative system that includes a host and an NVM package with a memory controller, according to various embodiments.

FIG. 1 is a diagram depicting system 100, including NVM package 104 and host 102. Host 102 may be configured to provide memory access requests (e.g., read, write, and erase commands) to NVM package 104, which can include memory controller 106, host interface 110, and NVM dies 112 a-n with corresponding NVMs 128 a-n.

Host 102 can be any of a variety of host devices and/or systems, such as a portable media player, a cellular telephone, a pocket-sized personal computer, a personal digital assistant ("PDA"), a desktop computer, a laptop computer, and/or a tablet computing device. NVM package 104 can include NVMs 128 a-n (e.g., in NVM dies 112 a-n) and can be a ball grid array package or other suitable type of integrated circuit ("IC") package. NVM package 104 can be part of and/or separate from host 102. For example, host 102 can be a board-level device and NVM package 104 can be a memory subsystem that is installed on the board-level device. In other embodiments, NVM package 104 can be coupled to host 102 with a wired (e.g., SATA) or wireless (e.g., Bluetooth™) interface.

Host 102 can include host controller 114 that is configured to interact with NVM package 104. For example, host 102 can transmit various access requests, such as read, write, and erase commands, to NVM package 104. Host controller 114 can include one or more processors and/or microprocessors that are configured to perform operations based on the execution of software and/or firmware instructions. Additionally or alternatively, host controller 114 can include hardware-based components, such as application-specific integrated circuits ("ASICs"), that are configured to perform various operations. Host controller 114 can format information (e.g., commands and/or data) transmitted to NVM package 104 according to a communications protocol shared between host 102 and NVM package 104.

Host controller 114 can obtain temperature measurements for system 100 from one or more ambient temperature sensors 136. Temperature sensor 136 is depicted in FIG. 1 as a dashed box to illustrate that it can be located in any suitable location, such as, for example, on a board and/or affixed to a housing of system 100. Ambient temperature sensors 136 may be used by host controller 114 (or other component of system 100) to determine the external temperature of the host.

Host 102 can include volatile memory 108. Volatile memory 108 can be any of a variety of volatile memory types, such as cache memory or RAM. Host 102 can use volatile memory 108 to perform memory operations and/or to temporarily store data that is being read from and/or written to NVM package 104. For example, volatile memory 108 can temporarily store a set of access requests to be sent to, or to store data received from, NVM package 104.

Host 102 can communicate with NVM package 104 over communications channel 116 using host interface 110 and memory controller 106. Communications channel 116 can be any bus suitable for bidirectional communications. Communications channel 116 can be fixed, detachable, or wireless. Communications channel 116 can be, for example, a universal serial bus (USB), serial advanced technology (SATA) bus, or any other suitable bus.

Memory controller 106 can include one or more processors and/or microprocessors 120 that are configured to perform operations based on the execution of software and/or firmware instructions. Additionally or alternatively, memory controller 106 can include hardware-based components, such as ASICs, that are configured to perform various operations. Memory controller 106 can perform a variety of operations, such as dispatching commands issued by host 102.

Host controller 114 and memory controller 106, alone or in combination, can perform various memory management functions, such as garbage collection and wear leveling. In implementations where memory controller 106 is configured to perform at least some memory management functions, NVM package 104 can be termed "managed NVM" (or "managed NAND" for NAND flash memory). This can be in contrast to "raw NVM" (or "raw NAND" for NAND flash memory), in which host controller 114, external to NVM package 104, performs memory management functions for NVM package 104. In some embodiments, NVM package 104 can be termed a solid state drive (SSD).

In some embodiments, host controller 114 and memory controller 106 can be part of the same memory device. Although there can be overlap, host controller 114 and memory controller 106 can perform different roles. For example, host controller 114 may perform and provide user-facing functionality for the memory device, such as performing operations to provide a user interface and responding to user input (e.g., requests to play a particular media file). Memory controller 106 may perform and provide memory-based functionality for the memory device, such as implementing memory access requests from host controller 114 (e.g., converting from logical to physical addressing), performing memory management operations, and/or performing ECC operations.

As depicted in FIG. 1, memory controller 106 can be incorporated into the same package as NVM dies 112 a-n. In other embodiments, memory controller 106 may be physically located in a separate package or in the same package as host 102. In some embodiments, memory controller 106 may be omitted, and all memory management functions that are normally performed by memory controller 106 (e.g., garbage collection and wear leveling) can be performed by a host controller (e.g., host controller 114). Memory controller 106 or host 102 can include a flash translation layer (FTL) for maintaining a logical-to-physical mapping.

NVM package 104 may include volatile memory 122. Volatile memory 122 can be any of a variety of volatile memory types, such as cache memory or RAM. Memory controller 106 can use volatile memory 122 to perform access requests and/or to temporarily store data that is being read from and/or written to NVMs 128 a-n in NVM dies 112 a-n. For example, volatile memory 122 can store firmware and memory controller 106 can use the firmware to perform operations on NVM package 104 (e.g., read/program operations). In some embodiments, volatile memory 122 can be included within memory controller 106.

Memory controller 106 can obtain temperature measurements for NVM package 104 from one or more temperature sensors 130. Temperature sensor 130 is depicted in FIG. 1 as a dashed box to illustrate that it can be located in any suitable location, such as, for example, on a board, within memory controller 106, and/or affixed to the packaging of NVM package 104. Temperature sensors 130 may be used by memory controller 106 (or other component of system 100) to determine the environmental temperature of NVM package 104.

Memory controller 106 can use shared internal bus 126 to access NVMs 128 *a-n* and can use NVMs 128 *a-n* to persistently store a variety of information, such as debug logs, instructions, and firmware that NVM package 104 uses to operate. Although only one shared internal bus 126 is depicted in NVM package 104, an NVM package can include more than one shared internal bus. Each internal bus can be connected to multiple (e.g., 2, 3, 4, 8, 32, etc.) memory dies as depicted with regard to NVM dies 112 *a-n*. NVM dies 112 *a-n* can be physically arranged in a variety of configurations, including a stacked configuration, and may be, according to some embodiments, integrated circuit ("IC") dies.

NVMs 128 *a-n* can be any of a variety of NVM, such as NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), phase change memory ("PCM"), or any combination thereof. In one embodiment, NVMS 128*a-n* can be three-dimensional (3D) Nand. 3D Nand improves on regular two-dimensional storage by stacking storage cells in increase capacity through higher density, lower cost per gigabyte, and provides reliability, speed, and performance expected of solid-state memory. MLC refers to programming multiple bits per cell, whereas single cell mode (SLC) refers to programming one bit per cell. In some embodiments, a subset of MLC can be a 2-bit cell, which can be programed with two bits per cell. In other embodiments, a subset of MLC can be a three level cell (TLC), which can be programmed with three bits per cell.

NVMs 128 *a-n* can be organized into "blocks", which can the smallest erasable unit, and further organized into "pages", which can be the smallest unit that can be programmed or read. In some embodiments, NVMs 128 *a-n* can include multiple integrated circuits, where each integrated circuit may have multiple blocks. Memory locations (e.g., blocks or pages of blocks) from corresponding integrated circuits may form "super blocks". Each memory location (e.g., page or block) of NVMs 128 *a-n* can be referenced using a physical address (e.g., a physical page address or physical block address). Memory locations (e.g., blocks or pages of blocks) from corresponding integrated circuits may be logically grouped together to form "bands". Bands can provide operational parallelism, thereby enabling programming, reading, and erase operations to be performed in parallel for blocks located on different integrated circuits. Each memory location of NVMs 128*a-n* can be referenced using a physical address (e.g., a physical page address or physical block address). In one embodiment, a stripe can refer to a multi-plane page taken from multiple dies (e.g., all dies). A band can refer to a multi-plane block taken from multiple dies (e.g., all dies). As such, a band can include "X" number of stripes, depending on the type of NVM and vendor.

NVM dies 112 *a-n* can also each include one or more temperature sensors (not shown) located in and/or around NVMs 128 *a-n*. Temperature sensors can be located in any suitable location, such as, for example, spaced throughout the die to provide temperature measurements corresponding to NVMs 128 *a-n*. The temperature measurements from the temperature sensors can be provided to memory controller 106 over shared internal bus 126 and/or one or more other internal channels (not shown) between NVM dies 112 *a-n* and memory controller 106. The temperature measurements from the temperature sensors may be used to determine the temperature of a portion of NVM. This temperature information may be used in a variety of ways. For example, temperature information may be to determine whether perform temperature based moves.

NVMs 128*a-n* may be partitioned to include two or more different partition types. For example, NVMs 128*a-n* can be partitioned to have an SLC partition and a MLC partition (e.g., a TLC partition). As another example, NVMs 128*a-n* can be partitioned to have a SLC partition, a first MLC partition (e.g., a two-level cell partition), and a second MLC partition (e.g., a TLC partition). The manner in which NVMs 128*a-n* are partitioned is a design choice. For example, some NVMs can be dedicated solely as a SLC partition, such as partition 132*a*, and other NVMs can be dedicated solely as a MLC partition, such as partition 132*b*. In this approach, at least one die is SLC partitioned, and at least one other die is MLC partitioned so that the combination of all NVMs results in a multi-partitioned NVM arrangement. As another example, each NVM can be dual partitioned to include both SLC and MLC partitions, such as SLC partition 132*c* and MLC partition 132*d*.

NVMs 128 *a-n* may store metadata associated with the NVM. The metadata may include information that describes the data stored in NVMs 128 *a-n* of NVM package 104. The metadata may also include a variety of additional information such as timestamp information (e.g., the time at which a memory cell was last programmed) and wear information (e.g., information indicating the number of times various portions of NVM have been programmed and/or erased). In some embodiments, metadata associated with NVMs 128 *a-n* may be stored in page or block headers (e.g., portions of each page or block that can be dedicated to storing metadata). Storing this metadata in page and/or block headers may be appropriate as program/erase (P/E) cycle counts, write amplifications, time elapsed, and temperature profiles may be localized factors specific to each block and/or page. Additionally or alternatively, this metadata may be stored in a separate table that can be easily accessed by memory controller 106 and/or host controller 114 to make temperature based move decisions. For example, during operation a table including metadata may be stored in volatile memory 122 and/or volatile memory 108.

Each partition type is associated with a program/erase endurance (also referred to as endurance, hereafter) that may refer to the average number of P/E cycles the NVM of that type may endure before it fails. A P/E cycle refers to the number of times a block (or other erasable segment) has been erased. SLC NVM is typically much more robust relative to MLC NVM. As an example, SLC NVM may average 100,000 P/E cycles, whereas a TLC NVM may average about 3,000 P/E cycles. Various parameters including P/E cycles, write amplifications, garbage collection, wear leveling, etc. may be maintained by NVM package 104. For example, memory controller 106 can log the P/E cycle count for each partition for the NMV as a whole, or at a die level, a band level, a block level, a page level, or other granular level. The P/E cycle counts can be temporarily stored in volatile memory 122 and can be periodically stored in the NVM (e.g., at predetermined intervals or prior to shutdown) as metadata. These parameters can be used by a balance proportion scheme according to embodiments discussed herein. The balance proportion scheme ensures that, even though each partition type has a different associated endurance, all partition types are used proportionally with respect to each other to balance their respective P/E cycles. This way, both partition types will reach the upper limits of their respective endurance levels out at approximately the same time.

Figure 2:
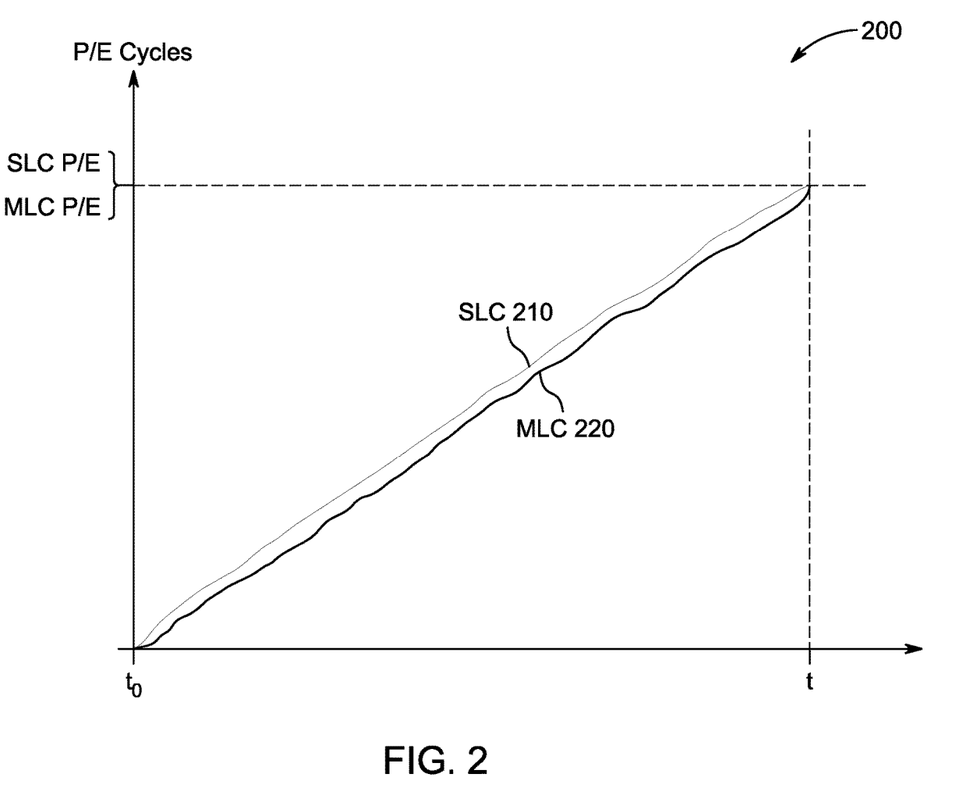
FIG. 2 shows an illustrative P/E cycle versus time in accordance with an embodiment.

FIG. 2 shows an illustrative P/E cycle versus time in accordance with an embodiment. Chart 200 shows time along the x-axis and includes time, t, which may represent the minimum operational lifetime of the NVM. Chart 200 also shows P/E cycles for two different partition types: one for SLC and another for MLC. The SLC P/E cycles value has been scaled down to have a 1-to-1 parity with the MLC P/E cycles. This 1-to-1 parity can be represented by an ideal endurance slope. As explained above, the endurance of the SLC partition is substantially greater than the endurance of the MLC partition. For example, the SLC average P/E cycles can be scalar factor of 10×, 20×, 30×, or some other multiplication factor more than the average P/E cycles of the MLC partition. As a specific illustrative example, assume that the SLC partition is 30× more robust than the MLC partition. Thus for every 1,000 P/E cycles of MLC, SLC can endure 30,000 P/E cycles. Chart 200 shows SLC line 210 and MLC line 220. In an ideal case, as shown here, both SLC line 210 and MLC line 220 are approximately on parity with each other from time, to, to time, t, and closely follow the ideal endurance slope. This illustrates that the P/E cycles for both SLC and MLC partitions are balanced throughout their operational life.

Figure 3:
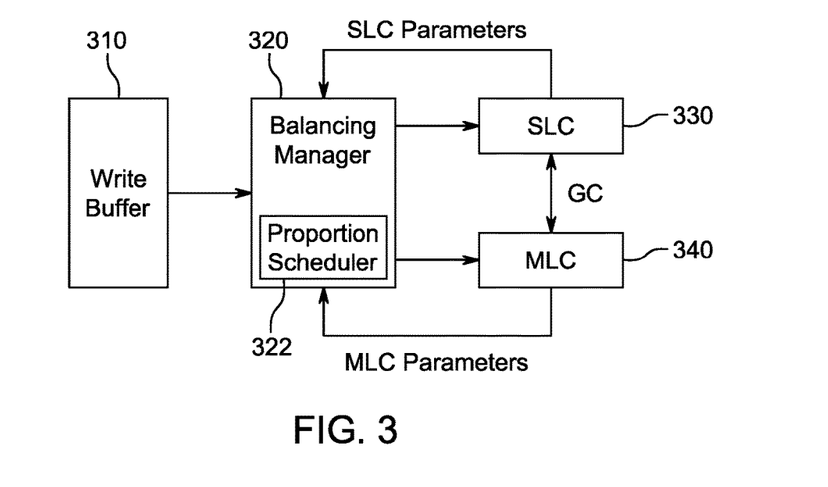
FIG. 3 shows a block diagram showing functional blocks for executing a proportional balancing scheme according to an embodiment.

FIG. 3 shows a block diagram showing functional blocks for executing a proportional balancing scheme according to an embodiment. As shown, FIG. 3 can include write buffer 310, balancing manager 320, SLC partition 330, and MLC partition 340. Write buffer 310 and balancing manager 320 may be implemented, for example, in memory controller 106 of FIG. 1. SLC partition 330 and MLC partition 340 may be embodied in NMVs 128a-n of FIG. 1. Write buffer 310 may represent a data source that provides data to be written to the NVM. As the data is being transmitted from write buffer 310 to the NVM, balancing manager 320 can direct the data to SLC partition 330 and MLC partition 340 based on a proportional balancing scheme according to embodiments discussed herein. SLC parameters (e.g., P/E cycles, write amplifications, and other metadata) may be provided to balancing manager 320. MLC parameters (e.g., P/E cycles, write amplifications, and other metadata) may be provided to balancing manager 320. The SLC and MLC parameters may provide an indication of SLC and MLC usage. As one illustrative example, SLC and MLC usage may refer to SLC P/E cycles and MLC P/E cycles. As another illustrative example, SLC and MLC usage may collectively take into account P/E cycles, write amplifications, and temperature. It should be understood that the SLC and MLC parameters may be provided to balancing manager 320 from locations other than the SLC and MLC partitions. Garbage collection operations (shown as GC) can be performed on both SLC and MLC partitions.

In one embodiment, balancing manager 320 may independently determine how best to proportionally balance writes to the SLC and MLC based on the MLC and SLC parameters. That is, based on the knowledge of SLC and MLC endurance, balancing manager 320 can detect when a deviation between SLC and MLC endurance exceeds a threshold, and when that threshold is exceeded, balancing manager 320 can auto-calculate how to proportionally balance writes to compensate for the deviation and to ensure that the SLC and MLC partitions stay balanced throughout their operational lives. For example, balancing manager 320 may evaluate the SLC and MLC parameters to determine whether SLC partition 330 is "overheating" or whether MLC partition 340 is "overheating," and depending on whether which partition is "overheating," balancing manager 320 can determine how writes should be directed from write buffer 310 to SLC partition 330 and MLC partition 340. A partition may be overheating when its proportional usage outweighs the proportional usage of another partition. Thus, if the SLC partition is overheating, balancing manger 320 may adjust the write balance to "cool down" writes to the SLC partition relative to the MLC partition so that both the SLC and MLC partitions approximate the ideal endurance slope.

In another embodiment, balancing manager 320 may access proportion scheduler 322, which may be a look up table that specifies how to proportionally balance writes to the SLC and MLC based on the SLC and MLC parameters. That is, balancing manager 320 may evaluate the SLC and MLC parameters to determine whether SLC partition 330 is "overheating" or whether MLC partition 340 is "overheating," and depending on whether a partition is "overheating," the lookup table in proportion scheduler 322 may be accessed to determine how writes should be directed from write buffer 310 to SLC partition 330 and MLC partition 340. Thus, if the SLC partition is overheating, balancing manager 320 may access a SLC specific schedule in proportion scheduler 322, or if the MLC partition is overheating, balancing manager 320 may access a MLC specific schedule in proportion schedule 322.

Figure 4A:
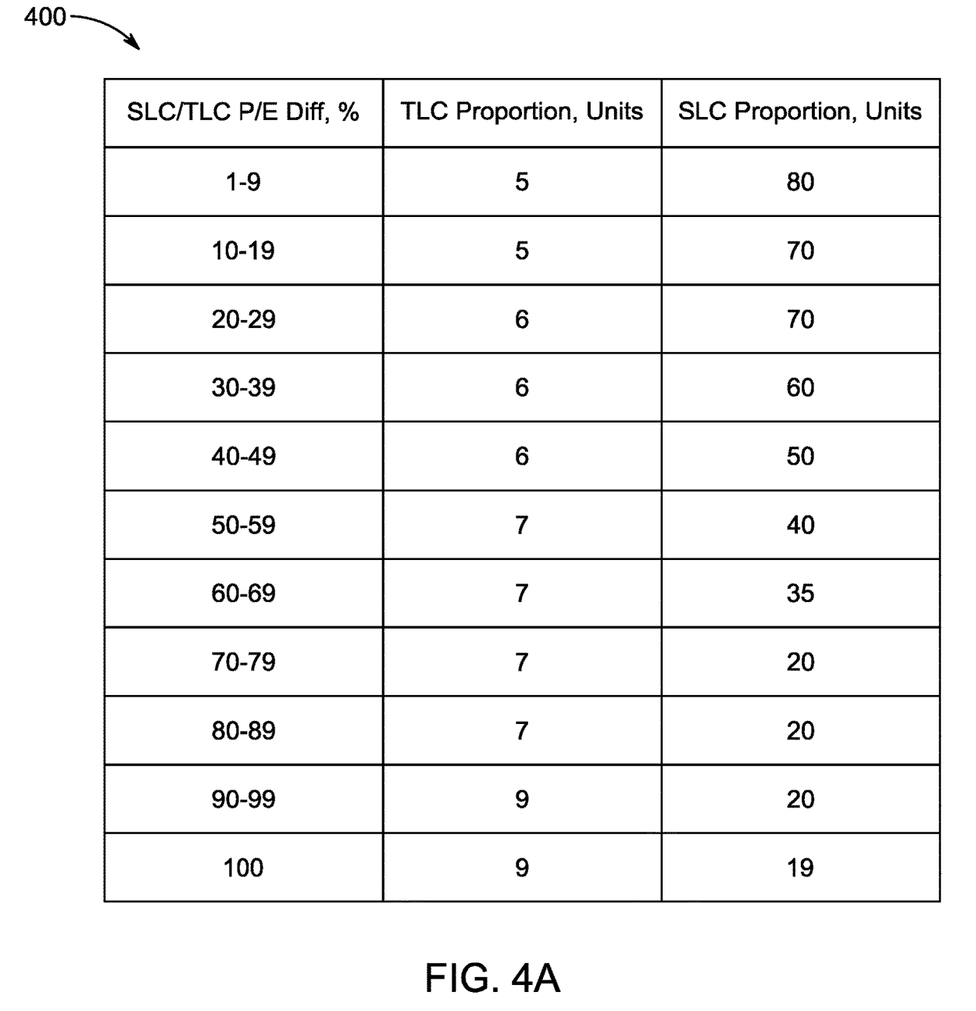
FIG. 4A shows an illustrative schedule for SLC overheating according to an embodiment.
Figure 4B:
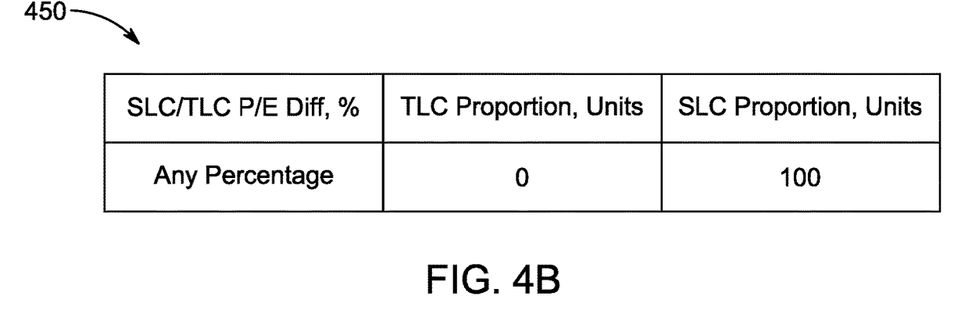
FIG. 4B shows an illustrative schedule for MLC overheating according to an embodiment.

FIG. 4A shows illustrative schedule 400 for SLC overheating and FIG. 4B shows illustrative schedule 450 for TLC overheating according to various embodiments. Both schedules 400 and 450 include three columns, labeled as SLC/TLC P/E Difference %, TLC proportion (units), and SLC proportion (units). The SLC/TLC P/E Difference % column represents the percentage difference between the average P/E cycles of the SLC partition and the average P/E cycles of the MLC partition. In one embodiment, the SLC/TLC P/E Difference % can be calculated based on the following equation:

$$\text{Diff \%} = \frac{(SLCPEAVG - TLCPEAVG * S)}{SLCPEAVG}$$

where SLCPEAVG is the average P/E cycle usage of the SLC partition, TLCPEAVG is the average P/E cycle usage of the TLC partition, and S is the scalar of the endurance difference between the SLC and TLC partitions. For example, if the SLC partition is 30× more durable than the TLC partition, S is 30. For example, in schedule 400, if the Diff % falls between 1-9%, balancing manager 320 can direct 5 units of data to the TLC partition for every 80 units of data that are directed to the SLC partition. Schedule 400 also shows how the unit proportion balance changes depending on the range of Diff %. As the SLC partition becomes progressively overheated (e.g., approaching 100%), the proportional balance skews more heavily towards TLC versus SLC. For example, at 100%, balancing manager 320 can direct 9 units of data to the TLC partition for every 19 units of data directed to the SLC partition.

The TLC proportion (units) and the SLC proportion (units) refer to how many units of data are directed to the TLC and SLC partitions, depending on the Diff %. Units may be represented by any suitable size data chunk stored in the NVM. For example, a unit can be a page, a block, a combination of pages or blocks, a stripe, a band, or a portion of a band. In some embodiments, the unit is sized to strike a balance between increasing performance of the NVM and indirection fragmentation. For example, in one embodiment, with respect to the SLC partition, the unit can be $\frac{1}{8}^{th}$ of a band, and with respect to the TLC partition, the unit can be $\frac{1}{8}^{th}$ of a band. For example, in another embodiment, a unit can include several stripes.

Schedule 450 shows that when TLC is overheating, all data is directed to the SLC partition regardless of the Diff %. That is, all data will be written to the SLC partition first, and then can waterfall over to the TLC partition. The occurrence of TLC overheating is expected to be a very rare event.

Figure 4C:
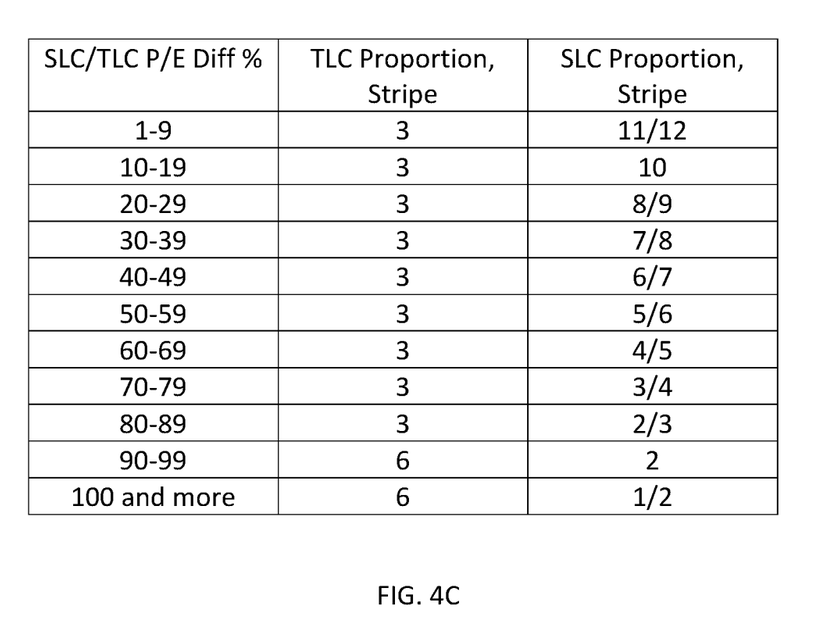
FIG. 4C shows another illustrative schedule for SLC overheating according to an embodiment.

FIG. 4C shows another illustrative schedule for SLC overheating according to an embodiment. In particular, FIG. 4C shows the TLC proportion and SLC proportion in terms of stripes. In other embodiments, the TLC proportion and SLC proportion can be expressed in terms of band. The SLC proportion shows that some row contain two ratios such as 11/12, 8/9, 7/8, etc. When two ratios exist, the balance manager can switches between the ratios. For example, if the Difference % is 1-9, the balance manager may switch between proportion ratios 3/11 and 3/12.

It should be understood that the ranges of Diff % and the values of the TLC and SLC proportion units are merely illustrative and any suitable ranges and values may be used. It should be understood that although the ranges and values were discussed in connection a TLC partition, the same concept can be applied to a MLC partition.

Many of the examples discussed herein refer to maintaining a balance between SLC and MLC partitions or a balance between SLC and TLC partitions. It should be understood that the balancing concepts discussed herein can be used for maintaining balance between partitions each having a different endurance. For example, a first partition may correspond to a first endurance and a second partition may correspond to a second endurance, where the first and second endurances are different. As a specific example, a first partition may correspond to 2-bit level cells and the second partition may correspond to 3-bit level cells.

Figure 5:
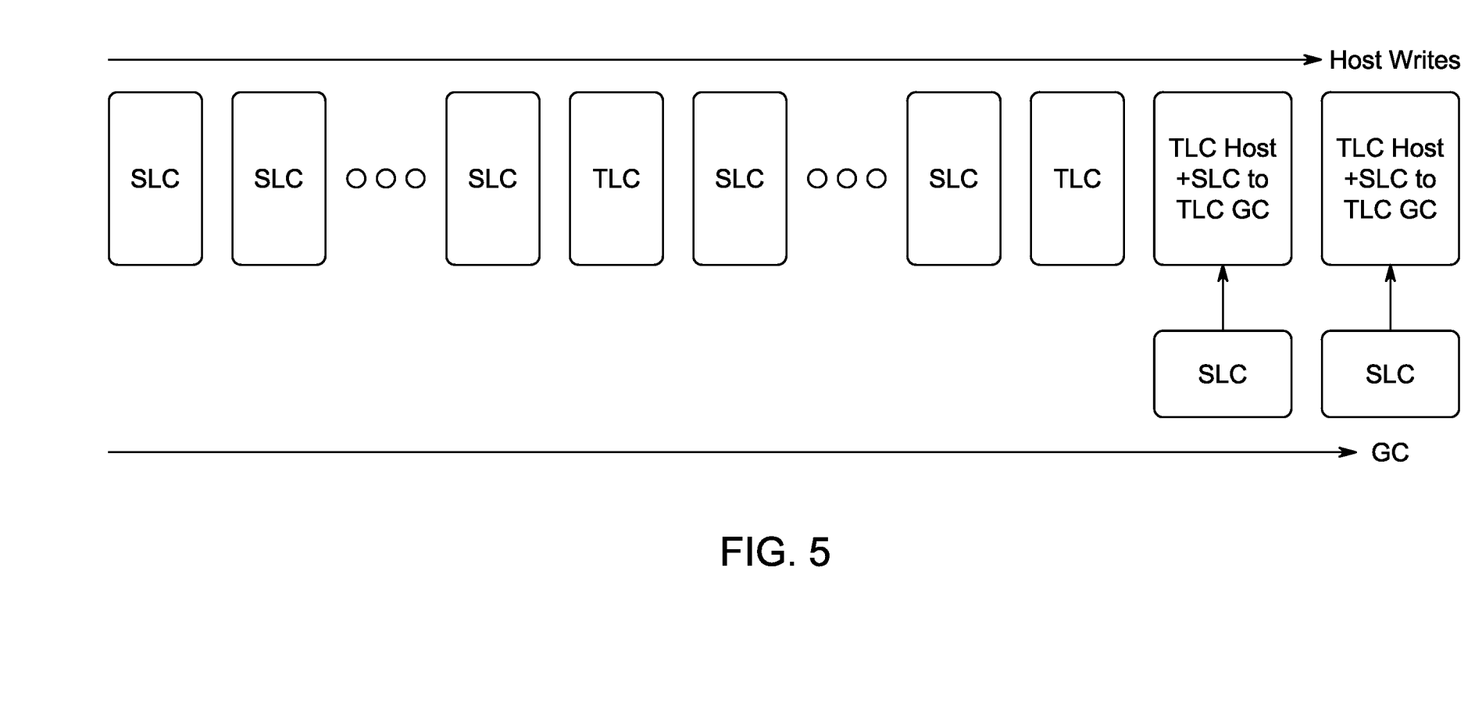
FIG. 5 shows an illustrative block diagram illustrating data being directed to SLC and MLC partitions based on a proportional balancing scheme according to an embodiment.

FIG. 5 shows an illustrative block diagram illustrating data being directed to SLC and TLC partitions based on a proportional balancing scheme according to an embodiment. Each block shown in FIG. 5 is represented by a unit for its partition type. For example, each block can represent data stored in a portion of a band. As host writes come in from the write buffer, several SLC blocks are written for every TLC block. Two garbage collection commands show SLC blocks being garbage collected and written to TLC blocks.

Figure 6:
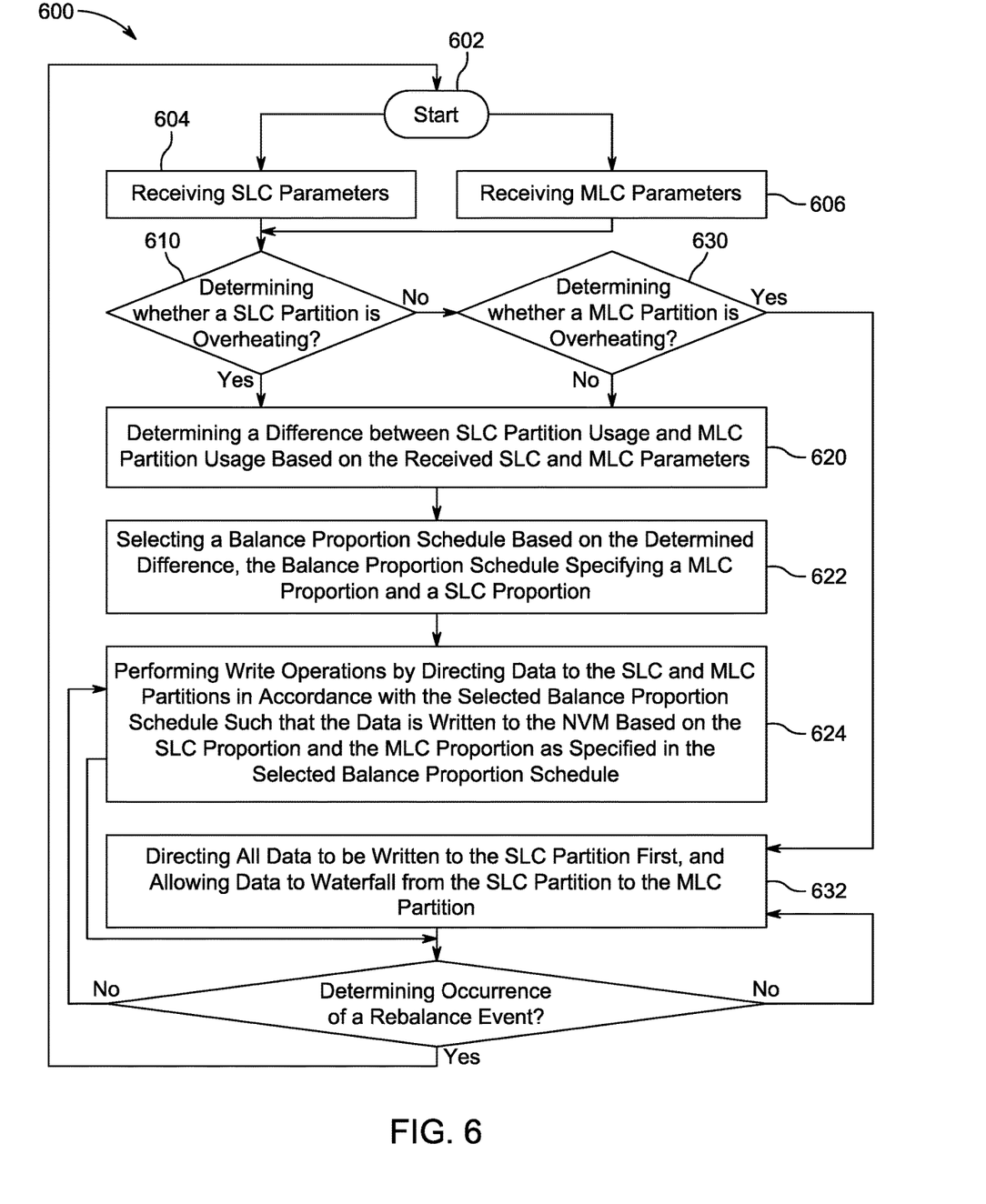
FIG. 6 shows illustrative process 600 according to an embodiment.

FIG. 6 shows illustrative process 600 according to an embodiment. Process 600 may be implemented, for example, by a balancing manager and can start at block, 602. At block 604, SLC parameters may be received, and at block 606, MLC parameters may be received. The SLC and MLC parameters may include P/E cycles, write amplifications, temperature, or any other suitable metadata. The SLC and MLC parameters may be continuously updated and reflect the lifetime statistics of each partition. At block 610, a determination is made whether a SLC partition is overheating. If the determination at block 610 is YES, process 600 can proceed to block 620. At block 620, a difference between SLC partition usage and MLC partition usage is determined based on the received SLC and MLC parameters. For example, the determined difference can be the same as the Diff %, as explained above. At block 622, a balance proportion schedule can be selected based on the determined difference, the balance proportion schedule specifying a MLC proportion and a SLC proportion. For example, the balance proportion schedule can be obtained by accessing a lookup table in proportion scheduler 322 of FIG. 3. At block 624, write operations can be performed by directing data to the SLC and MLC partitions in accordance with the selected balance proportion schedule. That is, data is written to the NVM based on the SLC proportion and the MLC proportion as specified in the selected balance proportion schedule.

Referring back to block 610, if the determination is NO, process 600 can determine whether the MLC is overheating at block 630. If the determination at block 630 is NO, process 600 can proceed to block 620. If the determination at block 630 is YES, process 600 can proceed to block 632, where all data is directed to be written to the SLC partition first, and is allowed to waterfall to the MLC partition.

Process 600 may transition to block 640 after flock 624 or block 630 to determine whether a rebalance event occurred. A rebalance event may indicate that the balance manager may need to reassess the state of the NVM to determine whether a new proportional schedule is required. Rebalance events may occur based on any suitable criteria, such as time, data transfer quantity, number of maintenance operations (e.g., wear leveling, garbage collection, etc.), or a power-on reset. If the determination at block 640 is YES, process 600 can loop back to start block 602. If the determination at block 640 is NO, process 600 can revert back to block 624 if operating in a SLC overheat mode or block 632 if operating in a MLC overheat mode.

It should be appreciated that the steps shown in FIG. 6 are merely illustrative and that additional steps may be added, some steps may be omitted, and the order of the steps can be changed. For example, if the MLC is determined to be overheating at block 630, the process may determine a Diff % and select the appropriate proportional balance schedule that governs how to proportionally balance the SLC and MLC partitions.

Figure 7:
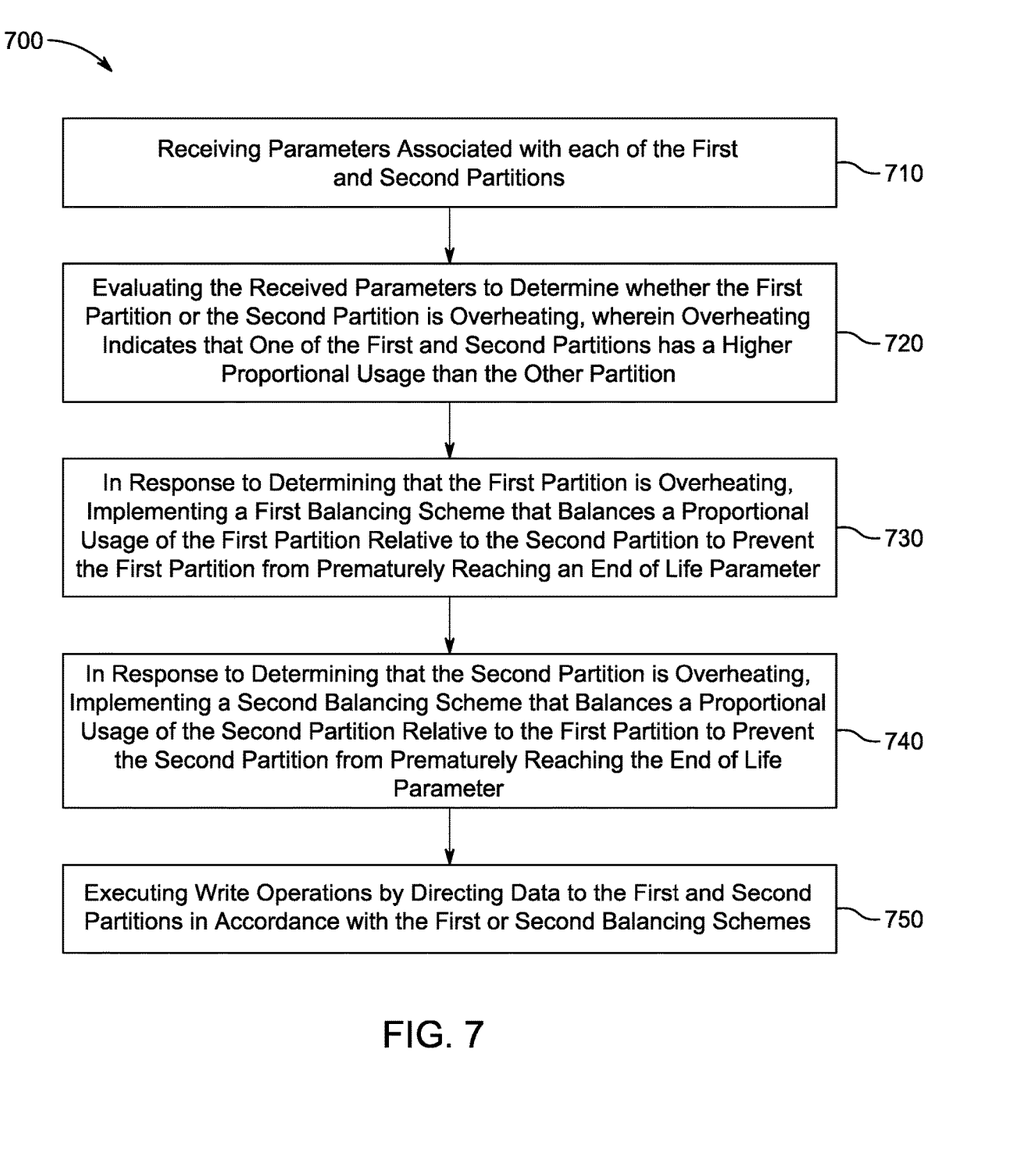
FIG. 7 shows another illustrative process 700 according to an embodiment.

FIG. 7 shows another illustrative process 700 according to an embodiment. Process 700 may be implemented in a system including non-volatile memory. The NMV can have first and second partitions each having different program/erase endurances. At step 710, parameters associated with each of the first and second partitions can be received. At step 720, the received parameters can be evaluated to determine whether the first partition or the second partition is overheating, wherein overheating indicates that one of the first and second partitions has a higher proportional usage than the other partition. In response to determining that the first partition is overheating, a first balancing scheme can be implemented that balances a proportional usage of the first partition relative to the second partition to prevent the first partition from prematurely reaching an end of life parameter (as shown in step 730). In response to determining that the second partition is overheating, a second balancing scheme can be implemented that balances a proportional usage of the second partition relative to the first partition to prevent the second partition from prematurely reaching the end of life parameter (as shown in step 740). At step 750, write operations can executed by directing data to the first and second partitions in accordance with the first or second balancing schemes.

It should be appreciated that the steps shown in FIG. 7 are merely illustrative and that additional steps may be added, some steps may be omitted, and the order of the steps can be changed.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

What is claimed is:

1. A method implemented in a computing device having a non-volatile memory comprising a first partition and a second partition each having different program/erase endurances, the method comprising, at the computing device:
   accessing parameters associated with each of the first partition and the second partition;
   evaluating the parameters to determine whether the first partition or the second partition is overheating, wherein overheating indicates that one of the first partition and second partition has a higher proportional usage than the other partition;
   in response to determining that the first partition is overheating, implementing a first balancing scheme that balances a proportional usage of the first partition relative to the second partition to prevent the first partition from prematurely reaching an end of life parameter;
   in response to determining that the second partition is overheating, implementing a second balancing scheme that balances the proportional usage of the second partition relative to the first partition to prevent the second partition from prematurely reaching the end of life parameter; and
   executing write operations by directing data to the first and second partitions in accordance with the first balancing scheme or the second balancing scheme.

2. The method of claim 1, wherein the first partition is a single-level cell partition, and wherein the second partition is a multi-level cell partition.

3. The method of claim 1, wherein implementing the first balancing scheme comprises:
   calculating a difference between first partition usage and second partition usage based on the parameters;
   selecting one of a plurality of balance proportion schedules based on the difference, wherein each of the balance proportion schedules specifies a first partition proportion and a second partition proportion; and
   directing write data to the first and second partitions in accordance with the first partition proportion and the second partition proportion.

4. The method of claim 3, wherein the difference is a difference percentage, and wherein each of the plurality of balance proportion schedules comprises a percentage range, a first unit value for the first partition proportion, and a second unit value for the second partition proportion.

5. The method of claim 4, wherein the first and second unit values for the first and second partition proportions, respectively, corresponds to a proportion of a band.

6. The method of claim 1, wherein implementing the first balancing scheme comprises:
   determining an endurance slope of the first partition based on the parameters;
   assessing whether a difference between the endurance slope of the first partition and an ideal endurance slope exceeds a threshold; and
   in response to an assessment that the difference exceeds the threshold, adjusting the proportional usage of the first partition relative to the second partition to alter the endurance slope to more closely align with the ideal endurance slope.

7. The method of claim 1, wherein implementing the second balancing scheme comprises:
   directing write data only to the first partition.

8. A non-transitory computer readable storage medium configured to store instructions that, when executed by a processor included in a computing device having a non-volatile memory comprising a first partition and a second partition each having different program/erase endurances, cause the computing device to carry out steps that include:
   accessing parameters associated with each of the first partition and the second partition;
   evaluating the parameters to determine whether the first partition or the second partition is overheating, wherein overheating indicates that one of the first partition and second partition has a higher proportional usage than the other partition;
   in response to determining that the first partition is overheating, implementing a first balancing scheme that balances a proportional usage of the first partition relative to the second partition to prevent the first partition from prematurely reaching an end of life parameter;
   in response to determining that the second partition is overheating, implementing a second balancing scheme that balances the proportional usage of the second partition relative to the first partition to prevent the second partition from prematurely reaching the end of life parameter; and
   executing write operations by directing data to the first and second partitions in accordance with the first balancing scheme or the second balancing scheme.

9. The non-transitory computer readable storage medium of claim 8, wherein the first partition is a single-level cell partition, and wherein the second partition is a multi-level cell partition.

10. The non-transitory computer readable storage medium of claim 8, wherein implementing the first balancing scheme comprises:
    calculating a difference between first partition usage and second partition usage based on the parameters;
    selecting one of a plurality of balance proportion schedules based on the difference, wherein each of the balance proportion schedules specifies a first partition proportion and a second partition proportion; and
    directing write data to the first and second partitions in accordance with the first partition proportion and the second partition proportion.

11. The non-transitory computer readable storage medium of claim 10, wherein the difference is a difference percentage, and wherein each of the plurality of balance proportion schedules comprises a percentage range, a first unit value for the first partition proportion, and a second unit value for the second partition proportion.

12. The non-transitory computer readable storage medium of claim 11, wherein the first and second unit values for the first and second partition proportions, respectively, corresponds to a proportion of a band.

13. The non-transitory computer readable storage medium of claim 8, wherein implementing the first balancing scheme comprises:
- determining an endurance slope of the first partition based on the parameters;
- assessing whether a difference between the endurance slope of the first partition and an ideal endurance slope exceeds a threshold; and
- in response to an assessment that the difference exceeds the threshold, adjusting the proportional usage of the first partition relative to the second partition to alter the endurance slope to more closely align with the ideal endurance slope.

14. The non-transitory computer readable storage medium of claim 8, wherein implementing the second balancing scheme comprises:
- directing write data only to the first partition.

15. A computing device, comprising:
- a non-volatile memory comprising a first partition and a second partition each having different program/erase endurances, and
- a processor configured to cause the computing device to carry out steps that include:
  - accessing parameters associated with each of the first partition and the second partition;
  - evaluating the parameters to determine whether the first partition or the second partition is overheating, wherein overheating indicates that one of the first partition and second partition has a higher proportional usage than the other partition;
  - in response to determining that the first partition is overheating, implementing a first balancing scheme that balances a proportional usage of the first partition relative to the second partition to prevent the first partition from prematurely reaching an end of life parameter;
  - in response to determining that the second partition is overheating, implementing a second balancing scheme that balances the proportional usage of the second partition relative to the first partition to prevent the second partition from prematurely reaching the end of life parameter; and
  - executing write operations by directing data to the first and second partitions in accordance with the first balancing scheme or the second balancing scheme.

16. The computing device of claim 15, wherein the first partition is a single-level cell partition, and wherein the second partition is a multi-level cell partition.

17. The computing device of claim 15, wherein implementing the first balancing scheme comprises:
- calculating a difference between first partition usage and second partition usage based on the parameters;
- selecting one of a plurality of balance proportion schedules based on the difference, wherein each of the balance proportion schedules specifies a first partition proportion and a second partition proportion; and
- directing write data to the first and second partitions in accordance with the first partition proportion and the second partition proportion.

18. The computing device of claim 17, wherein the difference is a difference percentage, and wherein each of the plurality of balance proportion schedules comprises a percentage range, a first unit value for the first partition proportion, and a second unit value for the second partition proportion.

19. The computing device of claim 18, wherein the first and second unit values for the first and second partition proportions, respectively, corresponds to a proportion of a band.

20. The computing device of claim 15, wherein implementing the first balancing scheme comprises:
- determining an endurance slope of the first partition based on the parameters;
- assessing whether a difference between the endurance slope of the first partition and an ideal endurance slope exceeds a threshold; and
- in response to an assessment that the difference exceeds the threshold, adjusting the proportional usage of the first partition relative to the second partition to alter the endurance slope to more closely align with the ideal endurance slope.

* * * * *